US011799342B2

(12) United States Patent
Frampton et al.

(10) Patent No.: US 11,799,342 B2
(45) Date of Patent: Oct. 24, 2023

(54) PRINTED CIRCUIT BOARD ELECTRICAL MACHINE

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 111 days.

(21) Appl. No.: 17/166,746

(22) Filed: Feb. 3, 2021

(65) Prior Publication Data

US 2021/0265889 A1    Aug. 26, 2021

Related U.S. Application Data

(60) Provisional application No. 62/978,876, filed on Feb. 20, 2020.

(51) Int. Cl.
| | |
|---|---|
| *H02K 3/26* | (2006.01) |
| *H02K 15/04* | (2006.01) |
| *H02K 21/24* | (2006.01) |
| *H02K 1/2795* | (2022.01) |

(52) U.S. Cl.
CPC ............ *H02K 3/26* (2013.01); *H02K 1/2795* (2022.01); *H02K 15/0407* (2013.01); *H02K 21/24* (2013.01); *H02K 2203/03* (2013.01)

(58) Field of Classification Search
CPC .. H02K 15/0407; H02K 1/2793; H02K 21/24; H02K 3/26; H02K 3/24; H02K 11/33; H02K 11/21; H02K 41/031; H02K 21/14
See application file for complete search history.

(56) References Cited

U.S. PATENT DOCUMENTS

| | | |
|---|---|---|
| 7,109,625 B1 | 9/2006 | Jore |
| 7,204,235 B1 | 4/2007 | Gebby et al. |
| 7,325,534 B1 | 2/2008 | Waters |
| 7,550,890 B2 | 6/2009 | Kloeppel |

(Continued)

FOREIGN PATENT DOCUMENTS

| | | | |
|---|---|---|---|
| CN | 102080576 A | * | 6/2011 |
| EP | 1670125 A1 | | 6/2006 |

(Continued)

OTHER PUBLICATIONS

CN-102080576-A machine translation Jul. 27, 2022.*

(Continued)

*Primary Examiner* — Leda T Pham
(74) *Attorney, Agent, or Firm* — Lempia Summerfield Katz LLC

(57) ABSTRACT

An electric machine includes a plurality of permanent magnets and a plurality of conductors. The plurality of permanent magnets are arranged radially around a rotation axis of the electric machine and spaced apart from the rotation axis of the electric machine. At least one of the plurality of magnets has a shape in a plane of rotation intersected by the rotation axis. The plurality of conductors are arranged relative to the plurality of magnets and spaced apart from each other circumferentially around the rotation axis of the electric machine. At least one of the plurality of conductors includes a trace having a polygon shape different than the shape of the at least one of the plurality of magnets.

15 Claims, 13 Drawing Sheets

(56) References Cited

U.S. PATENT DOCUMENTS

| | | | |
|---|---|---|---|
| 7,573,173 B1* | 8/2009 | Frownfelter | H02K 29/08 |
| | | | 310/268 |
| 7,699,749 B2 | 4/2010 | Tamura | |
| 8,001,765 B2 | 8/2011 | Kawakita | |
| 8,143,752 B2 | 3/2012 | Altindis | |
| 8,362,731 B2 | 1/2013 | Smith | |
| 8,558,425 B2 | 10/2013 | Shoemaker | |
| 8,716,913 B2 | 5/2014 | Kvam | |
| 8,723,052 B1 | 5/2014 | Sullivan | |
| 8,736,133 B1 | 5/2014 | Smith | |
| 8,785,784 B1 | 7/2014 | Duford | |
| 8,823,241 B2 | 9/2014 | Jore | |
| 9,154,024 B2 | 10/2015 | Jore | |
| 9,181,912 B2 | 11/2015 | Arihara | |
| 9,407,117 B2* | 8/2016 | Rimai | H02K 15/08 |
| 9,479,038 B2 | 10/2016 | Smith | |
| 9,502,941 B2 | 11/2016 | Seidler | |
| 9,595,849 B2 | 3/2017 | Marioni | |
| 9,702,294 B2 | 7/2017 | Willard | |
| 9,762,099 B2 | 9/2017 | Jore | |
| 9,768,674 B2 | 9/2017 | Elenga | |
| 9,800,109 B2 | 10/2017 | Shaw | |
| 9,859,763 B2 | 1/2018 | Shaw | |
| 9,885,304 B2 | 2/2018 | Date | |
| 10,038,349 B2 | 7/2018 | Long | |
| 10,044,237 B2 | 8/2018 | Woolmer | |
| 10,069,385 B2 | 9/2018 | King | |
| 10,069,388 B2 | 9/2018 | Court | |
| 10,116,195 B2 | 10/2018 | Lu | |
| 10,141,805 B2 | 11/2018 | Sromin | |
| 10,170,953 B2 | 1/2019 | Shaw | |
| 10,177,620 B2 | 1/2019 | Smith | |
| 10,186,922 B2* | 1/2019 | Schuler | H02K 11/30 |
| 10,193,429 B2 | 1/2019 | Smith | |
| 10,211,694 B1 | 2/2019 | Shaw | |
| 10,224,786 B2 | 3/2019 | Woolmer | |
| 10,256,758 B2* | 4/2019 | Frampton | H02P 9/04 |
| 10,348,225 B2 | 7/2019 | Phan | |
| 2006/0055265 A1 | 3/2006 | Zalusky | |
| 2007/0079795 A1 | 4/2007 | Gebby | |
| 2012/0262095 A1 | 10/2012 | Smith | |
| 2013/0119802 A1 | 5/2013 | Smith | |
| 2014/0042868 A1 | 2/2014 | Sullivan | |
| 2014/0175922 A1 | 6/2014 | Jore | |
| 2015/0015102 A1 | 1/2015 | Wong | |
| 2015/0041167 A1 | 2/2015 | Yamaguchi et al. | |
| 2015/0084446 A1 | 3/2015 | Atar | |
| 2015/0229194 A1 | 8/2015 | Sromin | |
| 2015/0318751 A1 | 11/2015 | Smith | |
| 2016/0164358 A1 | 6/2016 | Dehez | |
| 2017/0040878 A1 | 2/2017 | Smith | |
| 2017/0117726 A1 | 4/2017 | Jore | |
| 2017/0117763 A1 | 4/2017 | Woolmer | |
| 2017/0189822 A1 | 7/2017 | Lopatinsky | |
| 2017/0328296 A1 | 11/2017 | Kamio | |
| 2017/0366053 A1 | 12/2017 | Ash | |
| 2018/0013323 A1 | 1/2018 | Woolmer | |
| 2018/0026500 A1 | 1/2018 | Woolmer | |
| 2018/0145574 A1 | 5/2018 | Mccaw | |
| 2018/0198338 A1 | 7/2018 | Schuler et al. | |
| 2018/0219445 A1 | 8/2018 | Jore | |
| 2018/0323679 A1 | 11/2018 | Woolmer | |
| 2018/0323689 A1 | 11/2018 | Schuler et al. | |
| 2019/0072414 A1 | 3/2019 | Utermoehlen | |
| 2019/0074744 A1 | 3/2019 | Koenen | |
| 2019/0123607 A1 | 4/2019 | Smith | |
| 2019/0170052 A1 | 6/2019 | Dudar | |
| 2019/0229575 A1 | 7/2019 | Richards | |
| 2019/0229594 A1 | 7/2019 | Kuemmlee | |
| 2019/0245421 A1 | 8/2019 | Smith | |
| 2019/0288584 A1 | 9/2019 | Vansompel | |

FOREIGN PATENT DOCUMENTS

| | | | |
|---|---|---|---|
| GB | 2485185 | A | 5/2012 |
| GB | 2490972 | A | 11/2012 |
| GB | 2508026 | A | 5/2014 |
| GB | 2511542 | A | 9/2014 |
| GB | 2532963 | A | 6/2016 |
| GB | 2555860 | A | 5/2018 |
| GB | 2561217 | A | 10/2018 |
| GB | 2572172 | A | 9/2019 |
| JP | S61150646 | A | 7/1986 |
| JP | S61199451 | A | 9/1986 |
| JP | 2503703 | B2 | 12/1989 |
| JP | H05236716 | A | 9/1993 |
| JP | H0914038 | A | 1/1997 |
| JP | 3859036 | B2 | 11/1997 |
| JP | H10248224 | A | 9/1998 |
| JP | 2001238422 | A | 8/2001 |
| JP | 2002004908 | A | 1/2002 |
| JP | 2002320364 | A | 10/2002 |
| JP | 2004032900 | A | 1/2004 |
| JP | 2004088997 | A | 3/2004 |
| JP | 2005312173 | A | 11/2005 |
| JP | 2007085240 | A | 4/2007 |
| JP | 2015090129 | A | 5/2015 |
| WO | 2004064087 | A1 | 7/2004 |
| WO | 2012026889 | A1 | 3/2012 |
| WO | 2012156719 | A2 | 11/2012 |
| WO | 2013184107 | A1 | 12/2013 |
| WO | 2014080183 | A1 | 5/2014 |
| WO | 2016087817 | A1 | 6/2016 |
| WO | 2019180410 | A1 | 9/2019 |

OTHER PUBLICATIONS

Goodnight, N. et al., "Automotive Engine Performance; Excerpt: Fail-Safe Cooling System Mode: p. 301." Jones & Bartlett Learning. ISBN: 978-1-284-10206-2. (Accessed Sep. 6, 2019). https://books.google.com/books?id=rhmlDwAAQBAJ&pg=PA301&lpg=PA301.

European Office Action for European Patent Application No. 21157649.1-1201 dated Jun. 28, 2021.

* cited by examiner

ROTOR ASSEMBLY

PRINTED CIRCUIT BOARD ELECTRICAL MACHINE

CROSS REFERENCE TO PRIOR APPLICATION

This application claims priority benefit of Provisional Application No. 62/978,876 filed Feb. 20, 2020, which is hereby incorporated by reference in its entirety.

TECHNICAL FIELD

This disclosure relates in general to the field of electric machines including motors and generators, and in particular, the control of magnetic flux produced in an electric machine.

BACKGROUND

An electric machine may be an electromagnetic rotating machine that includes a rotor and a stator. The rotor and stator are positioned on opposite sides of an air gap through which a magnetic field is present and magnetic flux flows between the rotor and the stator. The magnetic field may be created by permanent magnets. While other examples are possible, the electric machine may be a motor or a generator. The generator, which may be referred to as an engine-generator set or a genset, may include a power source (e.g., an engine) and an alternator or another device for generating electrical energy or power from mechanical energy. The motor, on the other hand, receives electrical energy and converts it to mechanical energy by outputting torque.

BRIEF DESCRIPTION OF THE DRAWINGS

Exemplary embodiments are described herein with reference to the following drawings.

DETAILED DESCRIPTION

Figure 1:
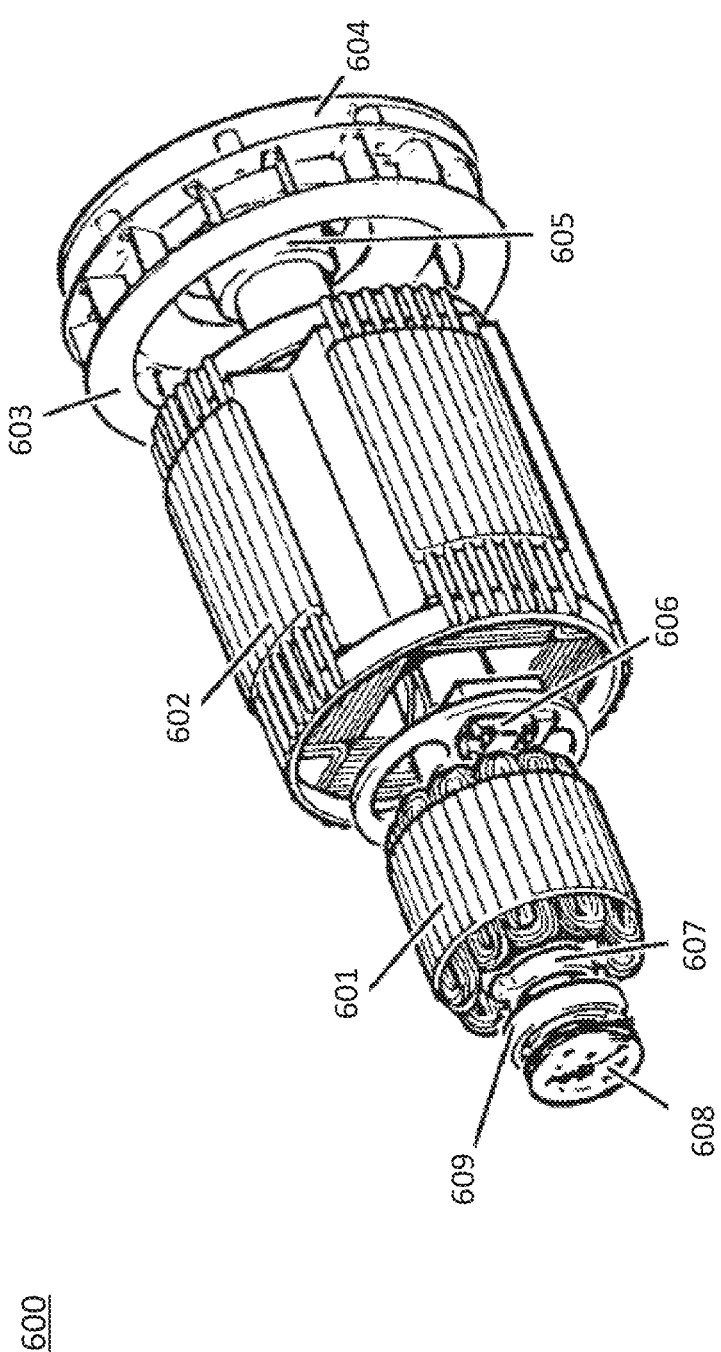
FIG. 1 illustrates an example rotor assembly.
Figure 2:
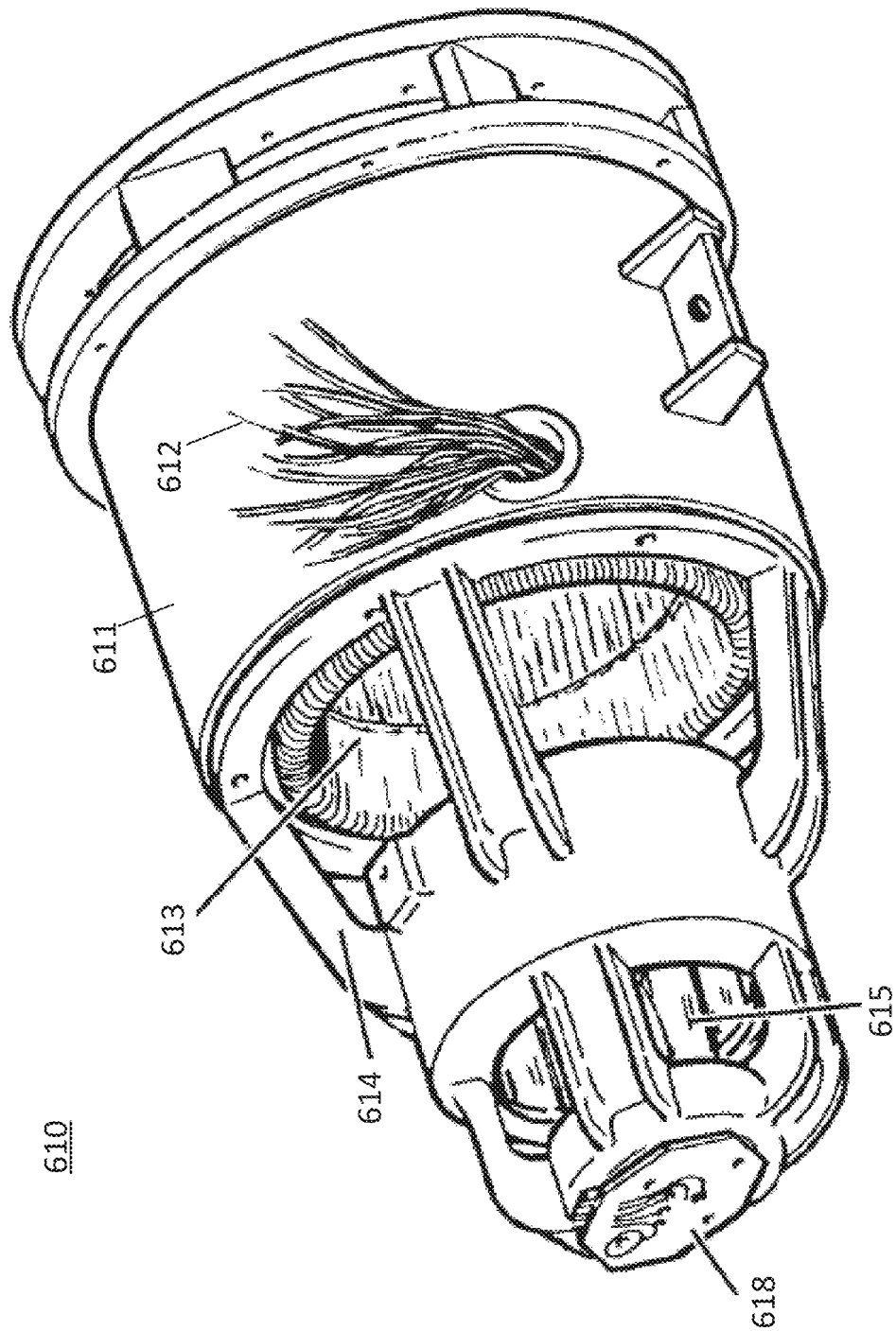
FIG. 2 illustrates an example stator assembly.

FIGS. 1 and 2 illustrate an example of an electric machine including permanent magnets, in this case, for the exciter of a generator. However, the permanent magnets may be included in either the main generator or the exciter. The permanent magnets may be included in either the rotor or the stator. While FIGS. 1 and 2 depict a wound rotor generator with a permanent magnet exciter, the electrical machine may also act as a motor as well. Other embodiments of electrical machines include permanent magnet brush-type DC machines, permanent magnet brushless DC machines, series-wound or universal machines, induction AC machines, synchronous AC machines, synchronous reluctance machines, switched reluctance machines, among others. Any machine may be used as a motor, selectively between a motor and a generator, or entirely as a generator.

FIG. 1 illustrates an example rotor assembly 600 for an electric machine. The rotor assembly 600 may include an exciter armature 601, a field coil assembly 602, a cooling fan 603, drive discs 604, a coupling 605, a rotor controller 606, a sensor 607, a rotor communication device 608, and a rotor bearing 609. Additional, different, or fewer components may be included.

The coupling 605 and/or drive discs 604 couple the rotor assembly 600 to a prime mover such as an engine. The coupling 605 is a fixed connection between the rotor assembly 600 and the engine via drive discs 604. Alternate devices that connect to the rotor assembly 600 to the engine include a splined shaft, a compliant member, or a fully constrained connection may be utilized under appropriate conditions.

It should be noted that while engine is used as a term to describe the prime mover converting fuel to a rotational speed and torque applied to a generator, any apparatus capable of providing mechanical torque and rotation or of requiring mechanical torque and rotation may be coupled to an electrical machine, operating as a motor or a generator. An electrical machine may also provide torque without causing rotation, such as to hold a position against a load. Thus, rotation is not required to define a device as an electrical machine.

Further, the engine maybe be configured for a constant speed or a variable speed that varies based on the load. Likewise, the alternator may be included in a variable speed generator.

For the rotor assembly 600 of an electrical machine shown in FIG. 1, the engine turns the rotor assembly 600, rotating the exciter armature 601 along with the field coil assembly 602. The engine may also turn the cooling fan 603. The cooling fan 603 forces air across the field coil assembly 602, the rotor controller 606, and/or the exciter armature 601, any of which may expel heat as current flows through the windings or other electrical components.

Some electrical machines, such as sealed machines, liquid-cooled machines and high-efficiency machines, may not require a cooling fan to maintain the internal components to a stable temperature. In addition, some electrical machines, such as induction machines, brushless DC machines, and switched reluctance machines, may contain fewer rotating elements in the rotor assembly. Further, some electrical machines, such as large synchronous machines and brush-type DC machines may contain more or different rotating elements in the rotor assembly.

FIG. 2 illustrates an example rotor stator assembly 610 for an electric machine. The stator assembly 610 includes a stator chassis 611, a set of leads 612, armature 613, an end bracket 614, an exciter field assembly 615, and a stator communication device 618. Additional, different, or fewer components may be included. The rotor assembly 600 fits inside the stator assembly 610. The exciter field assembly 615 is aligned with the exciter armature 601. The stator chassis 611 is aligned with the field coil assembly 602.

The exciter armature 601 includes exciter armature windings, and the exciter field assembly 615 includes permanent magnets as a source of magnetic flux. As the exciter armature windings rotate within the stator assembly 610, one or more currents are generated in the exciter armature windings. Two or more wires or other electrically conductive connections connect the exciter armature windings to the field coil assembly 602. The current from the exciter armature windings supplies current to the field coil assembly 602.

For the example stator assembly 610, the stator includes the stator windings 613 and the exciter includes permanent magnets. As the field coil assembly 602 rotates within the stator assembly 610, currents are generator in the armature 613. The current from the windings 613 is carried by the leads 612 to a load.

While the term windings may refer to conductive wires wrapped around a material, which may be ferromagnetic, the term windings may be extended to refer to any arrangement of conductive materials which encompasses a volume through which magnetic flux may flow. Similarly, coils, commonly referring to a grouping of conductive wires wound around a bobbin, ferrous member or other core, may be extended to include conductive material conscribing multiple wraps around a point in space.

Figure 3:
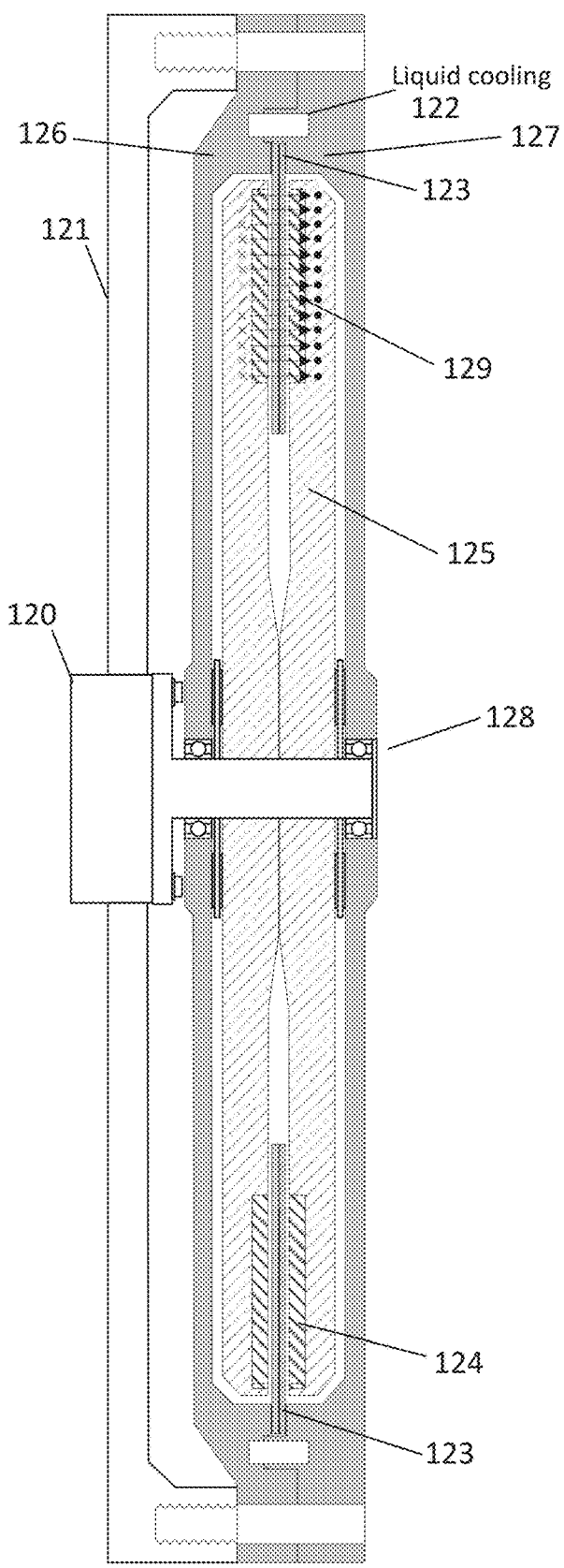
FIG. 3 illustrates an example side view of an electric machine.

FIG. 3 illustrates an example side view for an electric machine in which a stator 123 includes coils integrated with a printed circuit board (PCB) and is arranged in cooperation with a rotor 125 including permanent magnets. The stator 123 is connected to and engine block 121, rotating at the same rate as the engine block, which is commonly chosen as the stationary frame of reference for the electrical machine. The rotor 125 is connected to a crankshaft 120 protruding slightly from the engine block 121 and configured to allow rotation between the engine block 121 and the crankshaft 120. A liquid coolant may flow through the cooling passage 122 to partially or completely cool the stator 123 and may partially or completely cool the rotor 125 through the bearings 128 connecting the rotor to the stator 123.

The cooling passage 122 may be formed by the mating of an inner clamshell 126 and an outer clamshell 127, constraining the printed circuit board. The cooling passage 122 may exist in one or both of the inner clamshell 126 and the outer clamshell 127. The coolant may flow through multiple cooling passages in series, that is flow through one passage before flowing through the next. The coolant may flow through multiple cooling passages in parallel, meaning that the coolant flow may diverge to follow the multiple cooling passages and converge again after flowing through the passages, with some but not all the coolant flowing through each cooling passage. Combinations of series and parallel flow are possible.

The printed circuit board (stator 123) may be composed of a single printed circuit board assembly or multiple printed circuit board assemblies. The multiple printed circuit board assemblies may be attached together with a bonding agent, such as an epoxy, to increase drumhead stiffness. The printed circuit board may be composed of a plurality of layers, such as 2, 4, 6, 8 10, or 12 layers.

The printed circuit board 123 may include coils of wire, or traces, that are configured to intercept magnetic flux from the permanent magnets 124 on the rotor 125 as the rotor 125 and the permanent magnets 124 rotate past the printed circuit board (stator 123). The coils may be included in different layers of the printed circuit board.

For the electrical machine illustrated in FIG. 3 at a given moment in time, magnetic flux 129 flows from a north pole on a first rotor half, through the coils on the printed circuit board (stator 123), and into the south pole on a magnet on a second rotor half. The magnetic flux 129 flows tangentially through the material of the rotor 125, which may be ferrous to reduce the reluctance of the path, to nearby magnets oriented in the opposite direction on the second rotor half, returning to the south pole of a nearby magnet on the first rotor half through a nearby portion of the printed circuit board (stator 123).

The effective magnetic path length for flux flowing through the coils may be comparatively higher than the effective magnetic path length for an electrical machine where the rotor and stator both incorporate ferrous material to shape the magnetic flux and to reduce the effective path length. High permeability materials (ferrous materials) typically reduce the effective magnetic path length be decreasing the reluctance of the magnetic path. Inductance, also called reactance in relation to electrical machines, of the stator windings is inversely dependent on the magnetic path length, meaning that longer path lengths reduce inductance with all other factors being equal.

Reduction of stator winding inductance may prove valuable in certain applications were high-speed commutation is required. Higher inductance will increase the energy stored in the windings when the current is switched, so lower inductance will reduce the switching losses on commutation components connected to the electrical machine, such as diodes, silicon controlled rectifiers (SCRs), field effect transistors (FETs), insulated-gate bipolar transistors (IGBTs) or bipolar junction transistors (BJTs) configured to operate as synchronous rectifiers. This in turn may improve the efficiency of the electrical machine, improve the efficiency of power electronics driving the electrical machine, or reduce the cost of wiring or semi-conductor components connected to the electrical machine.

The electrical machine of FIG. 3 may also remove most of the ferrous material from the non-static magnetic path, which experiences changes in applied magnetic field. This may reduce the losses associated with reversal of dipoles within the ferrous material (e.g., iron losses or hysteresis losses). Using ferrous material for the rotor 125 may not increase losses significantly because the flux may not change appreciably on the side of the permanent magnets 124 opposite the air gap.

The shape of the windings may include concentric circles, rectangles, arc segments, trapezoids, or another shape. The stator windings may be formed from copper or another conductive material. The traces may exist on multiple layers of the PCB. The traces forming the exciter windings mat be configured to generate a voltage by electromagnetic induction when subjected to variations in the magnetic flux through the windings due to rotation of the rotor.

Figure 4:
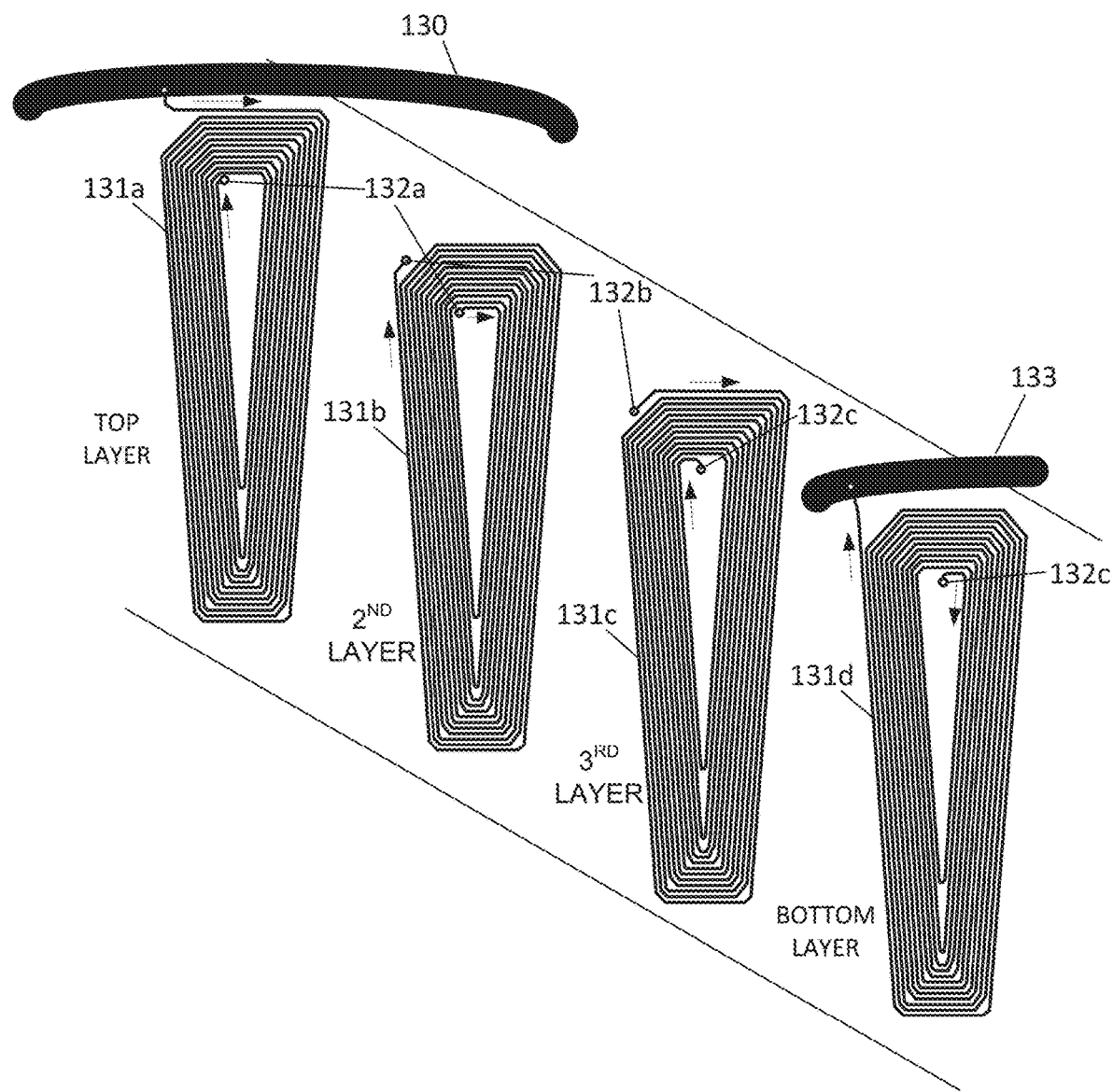
FIG. 4 illustrates an example winding diagram.

FIG. 4 illustrates example winding and magnet configuration which may act to reduce total harmonic distortion (THD) or to provide a specific waveshape that may reduce losses when rectified to supply a DC bus. The waveshape of the voltage generated by an electrical machine is related to the shape of the flux passing through the coil, the geometry of the coil, and any flux shaping elements (high permeability ferrous materials) that lie in the magnetic path. In the example of FIG. 4, the inner winding is truncated at a radius which lies inside the magnetically active area, reducing the effective flux seen by that turn and adjusting the waveshape produced by the winding.

The windings for the printed circuit board stator for the electrical machine illustrated in FIG. 4 are stacked through the thickness of the board but are drawn side by side for ease of illustration. Geometrically, the paths 131a-d are arranged in parallel. That is, as the layers of the PCB are arranged vertically the traces are also arranged vertically. However, because the winding direction alternates in adjacent layers, the electrical current through the trace along the paths 131*a-d* is a series path.

For the electrical machine illustrated in FIG. 4, windings on multiple layers are connected in series to increase the electrical voltage output of the electrical machine. Connections between layers on a printed circuit board are often performed using drilled and plated vias, passing through the entire printed circuit board. While blind vias (vias connecting only some of the layers) are possible, through vias may be easier to manufacture, as they can be drilled after the board stackup is complete. One way to use vias to connect only two of the layers together involves placing these vias at a different location on the board than other vias.

The electrical machine illustrated in FIG. 4 utilizes four layers in the printed circuit board used for the stator. These four layers each contain a coil composed of 12 turns, providing a total of 48 turns around flux passing through the area enclosed by the coil. Due to the shortened nature of the inner coil, the flux passing though the inner coil is reduced, resulting in a slightly different waveshape from that winding. The current flowing through any turn of this 48-turn coil is consistent, while the voltage generated by each coil is added. For example, at a certain operating speed, each coil may make, on average 48V. If the electrical machine is loaded with a 10 A load, each of the turns may have 10 A flowing on it.

The following description, following current flow through the windings illustrated in FIG. 4, serves as an explanation the flow of current through multiple layers of the printed circuit board stator in the electrical machine illustrated in FIG. 4. Current starts in a top layer circumferential trace 130 and flows into the coils 131*a* formed by traces on the top layer of the printed circuit board. After flowing through all coils formed by traces on the top layer of the printed circuit board, the current flows into the windings formed by traces on the second layer of the printed circuit board 131*b* through via 132*a*, illustrating the same via on two different layers. The current passes through the via 132*b* to flow through the traces on the third layer of the printed circuit board 131*c* and passes through the via 132*c* to flow through the traces on the bottom layer of the printed circuit board 131*d* before flowing to a bottom layer circumferential trace 133.

The top layer circumferential trace 130 may be a phase conductor for the electrical machine. The bottom layer circumferential trace 133 may be a neutral or common conductor for the electrical machine. The bottom layer circumferential trace 133 may be a second phase conductor for the electrical machine.

For the electrical machine illustrated in FIG. 4, current flowing from the top layer circumferential trace 130 to the bottom layer circumferential trace 133 will flow through the windings on the top layer in a clockwise direction, as indicated by the arrow, progressing from the outside of the coil to the inside of the coil. After crossing into the second layer at the interior via 132*a*, the current will continue to flow in a clockwise direction through the second layer, progressing from the inside of the coil to the outside of the coil before passing into the third layer to exterior via 132*b*. In the third layer, the current will flow in a clockwise direction as it progresses from the outside of the coil to the inside of the coil, before passing through to the bottom layer through interior via 132*c*. On the bottom layer, the current will flow in a clockwise direction as it progresses from the inside of the coil to the outside of the coil, ending on bottom layer circumferential trace 133.

Coils wound in opposite directions in the same position of an electrical machine may result in opposite generated voltage direction, meaning that clockwise turns may generate a positive voltage while negative turns are generating a negative voltage. If the direction of ration is reversed for coils connected in series on the same pole or the same phase, the net resulting voltage may be 0, even though each coil is generating voltage. Thus, it is often desirable to ensure that all coils maintain a similar winding direction.

While it is common to cross traces on a printed circuit board by using a different layer for each trace, this may be difficult to achieve in practice when all layers are populated with windings, such as the case when the printed circuit board is utilized as the stator for an electric machine. In this case, it becomes quite difficult to access the traces at the interior of a winding because the winding exists on all layers, prohibiting crossing on a different layer. For this reason, the invention disclosed herein prefers machine designs where each winding is composed by a series combination of an even number of layers, allowing the first layer of each pair to wind outside-in and the second layer of each pair to be wound inside-out, allowing access to the other end of the two-layer coil by presenting it at the outside of the coil.

Although an even number of layers is preferred, embodiments are contemplated where a board may have all coils in a single pole connected in parallel, where a board may have each group of two coils connected in parallel, and various other conceivable combinations of series and parallel connections, including the case where the windings from each layer are connected in parallel, placing the coils from odd layers in parallel and the coils from the even layers in parallel. Placing all odd layers in parallel and all even layers in parallel may provide the advantage of reducing the number of vias drilled into the board and reducing the time to draw coils due to identicality of all even and odd layers.

For an electrical machine with multiple poles, poles may be connected in series or in parallel. For example, the electrical machine of FIG. 4 may contain 12 poles on the stator (12 coils for phase A, 12 coils for phase B, and 12 coils for phase C). In this case, the poles of each phase may be connected in parallel or in series. For example, if 3 coils were connected in series and the groups were connected in parallel, the electrical machine of FIG. 4 may produce 144V under a specific operating condition and may have about 2.5 A flowing on each winding when supplying 10 A to the load. Similarly, if all 12 coils were connected in parallel, the electrical machine of FIG. 4 may produce 48V, but may only have 0.83 A flowing on each winding when supplying 10 A to the load. Connecting multiple coils in parallel on a given pole may reduce the output voltage and the current flowing in each coil further.

Although even number of layers are preferred, any number of layers may be used. The vias 132*a*, 132*b* and 132*c* may be placed in an area that is not in the magnetic region. The vias 132*a*, 132*b*, 132*c* may represent a larger grouping of vias to provide better current and heat transfer capability. The printed circuit board may be cooled through an electrically insulating but thermally conductive element to the housing. The heat may transfer primarily from the circumferential conductors, 130 and 133. The heat may also transfer from the end turns of the coils composed of traces on the printed circuit board 131*a*, 131*d*. The heat may transfer through the vias connecting the layers, the heat may transfer through the board substrate.

The electric machine described herein is also applicable to a case where the stator is cooled by forced or natural convection of air or another gaseous medium. One or more embodiments may include air as the cooling medium for the electrical machine, as either or both passive cooling and active cooling. In addition, air may flow within the electrical machine to transfer heat to the liquid or air-cooled outer housing without allowing external air ingress. External air may be brought in to cool the machine.

The stator windings 131a-d illustrated in FIG. 4 may also illustrate an eddy current reducing configuration when combined with specific magnet shapes. The shape of the paths 131a-d may also reduce THD. As shown the stator windings 131a-d, may have a trapezoidal shape. Alternatively, each set of the paths 131a-d may include some concentric paths with a trapezoidal shape and others with a triangular shape that may have one or more (e.g., two) chamfered edges. With different magnet geometry, the shape of the stator windings may change.

Figure 5:
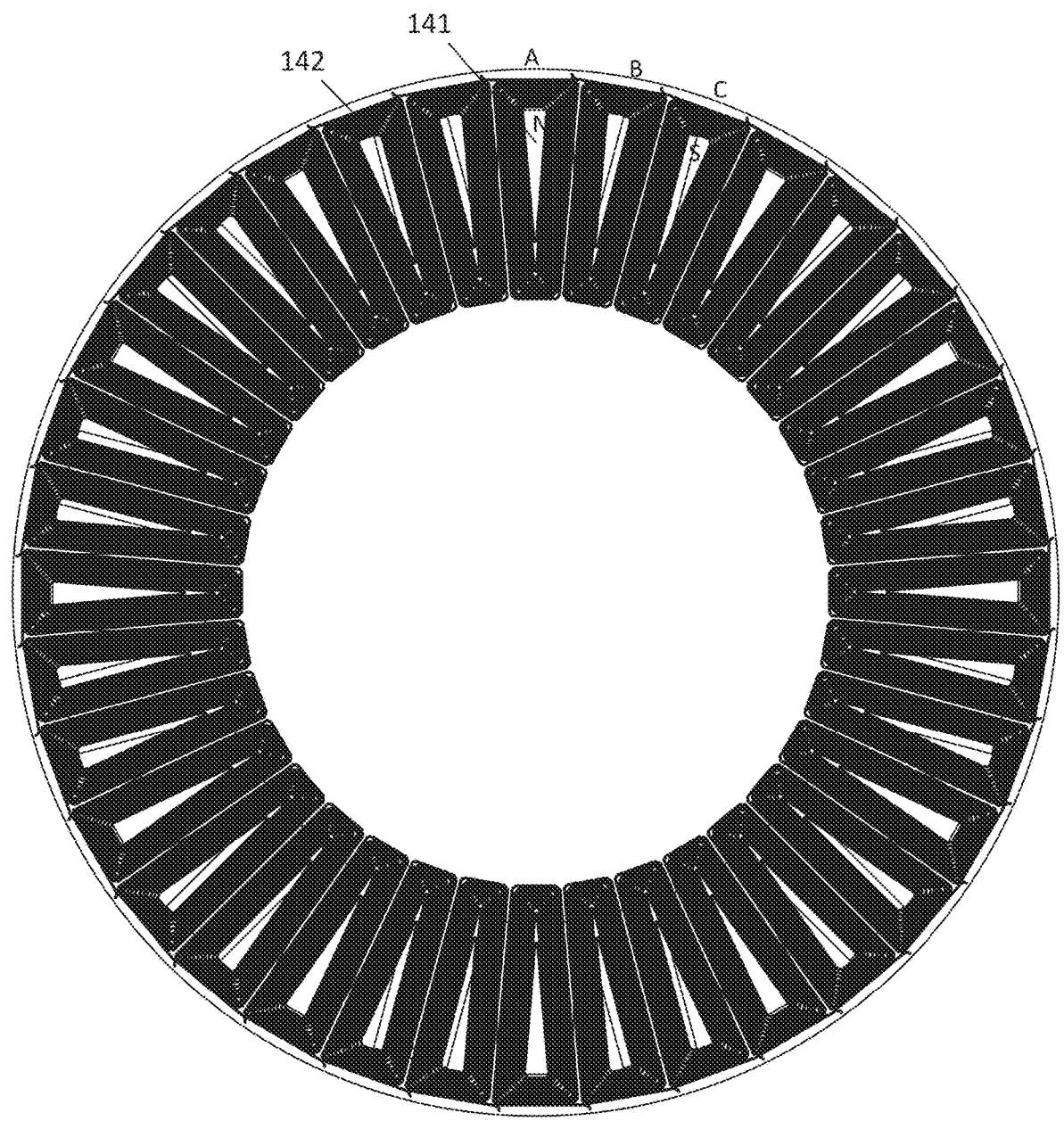
FIG. 5 illustrates an example printed circuit board with stator windings.
Figure 6:
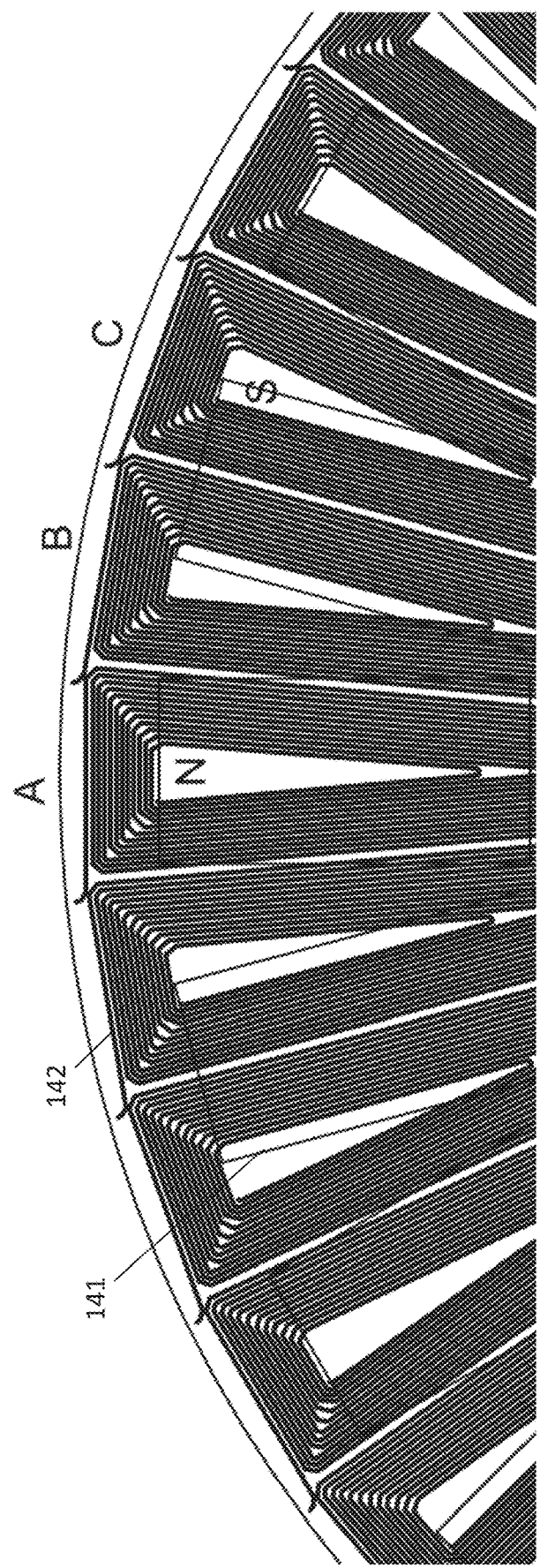
FIG. 6 illustrates an example portion of the electrical machine.

FIG. 5 illustrates a printed circuit board containing traces configured as stator windings for an electrical machine superimposed over the magnetic poles present in the rotor. FIG. 6 provides a detailed view of the top portion of the electrical machine of FIG. 5. The electrical machine of FIGS. 5 and 6 contains 12 stator poles (12 phase A windings, 12 phase B windings, and 12 phase C windings) and 24 rotor poles. This may be equivalent to a bobbin-wound 1/3 pitch electrical machine. The magnetic flux from a given permanent magnet 141 passes through the phase A winding, then the phase B winding, then the phase C winding as the electrical machine rotates clockwise. The stator phases are all oriented sequentially, thus the winding that the given permanent magnet 141 passes through after passing the indicated phase C winding is another phase A winding. Winding 142 is a phase B winding.

A different winding pitch may be used. For example, the printed circuit board containing the stator windings for an electrical machine as illustrated in FIGS. 5 and 6 may be placed in front of a rotor containing 48 magnets, providing a 2/3 pitch electrical machine. Other combinations are possible, including non-integer pole ratios, which may act to reduce torque ripple.

The electrical machine shown in FIGS. 5 and 6 may be a consequent pole electrical machine, with all north or south magnets omitted. Magnets with north facing the printed circuit board stator may be removed on one side of the printed circuit board stator and magnets with south facing the printed circuit board stator may be removed on the opposite side of the printed circuit board stator. Magnets with north facing the printed circuit board stator may be removed on both side of the printed circuit board stator. Magnets removed from the electrical machine illustrated in FIGS. 5 and 6 may be replaced with ferrous slugs or portions of the rotor plate to decrease the magnetic path length driven by each magnet.

The electrical machine of FIGS. 5 and 6 may utilize flux shaping elements in the rotors to increase the flux density through the printed circuit board stator. The flux shaping elements may allow focusing of the flux generated by a permanent magnet of large size through a smaller area in the printed circuit board stator.

The permanent magnets illustrated in FIGS. 5 and 6 may be discrete magnets, magnetized regions in a disk of magnetic material, or flux concentrating regions from a permanent magnet arrangement. Discrete magnets may be attached using an adhesive, a retaining fixture, a raised lip on the outside of the rotor, fasteners through the magnets, fasteners clamping the magnets, or another fastening technique.

A discrete magnet retaining fixture may be configured to be thinner than the magnets, thicker than the magnets or the same height as the magnets. The discrete magnet retaining fixture may be made of a metallic or non-metallic substance. The discrete magnet retaining fixture may be made of a non-conducting material, potentially reducing eddy current losses from current in the stator. The discrete magnet retaining fixture may contain features that act to increase centrifugal airflow within the electrical machine to improve cooling on the stator.

It should be noted that embodiments are contemplated where the magnetic field from the rotor is generated by current in a coil, where the permanent magnets are replaced or supplemented by electromagnets. In this configuration, the coils may be wound copper wire or traces on a printed circuit board. Embodiments are also contemplated for an induction machine using a printed circuit board for stator windings and a conductive pattern in the rotor forming the effect of a squirrel cage in an induction machine. The rotor pattern may be composed of formed metal or by patterns of conductive traces on a printed circuit board. In summary, the inventive concepts described herein may be applied to any type of electrical machine.

Figure 7:
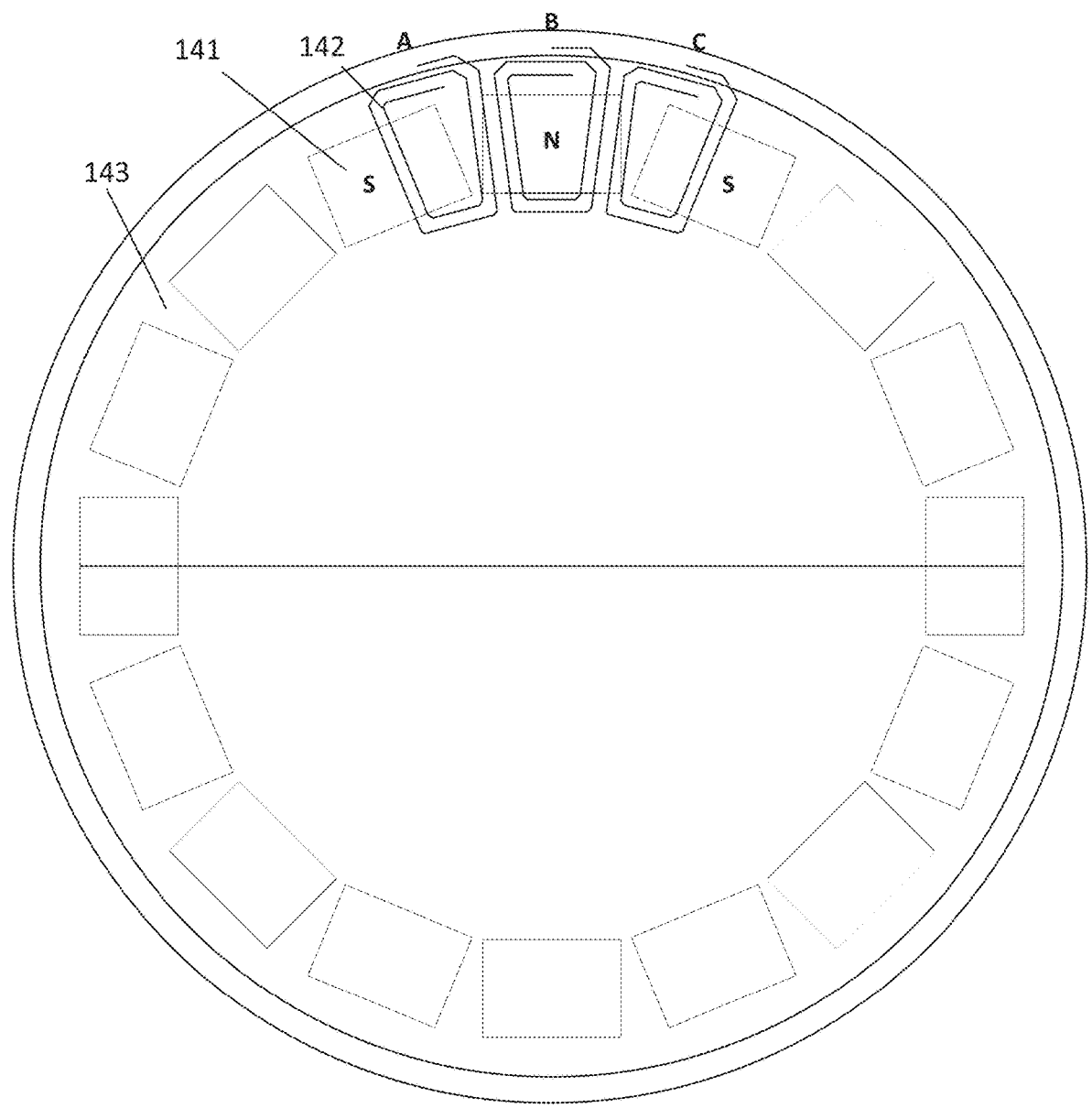
FIG. 7 illustrates an example electrical machine with stator windings as traces on a printed circuit board.

FIG. 7 illustrates a simplified electrical machine with stator windings as traces on a printed circuit board and 16 magnet poles on the rotor 143, such as south pole 141. The stator is configured to have 8 poles, alternating between phase A, phase B and phase C, such as phase A winding 142. The electrical machine of FIG. 7 may contain additional turns for each coil on the stator, as well as a symmetrical layout of stator coils. It should be noted that an electrical machine built with only the three coils as shown would function as an electrical machine. It is not necessary for the printed circuit board stator to form a complete circle for the machine to function, however the torque or power produced may be significantly lower than a complete stator would provide with the same magnetic material on the rotor, so it may be viewed as a waste of magnetic material to build a machine this way.

Figure 8A:
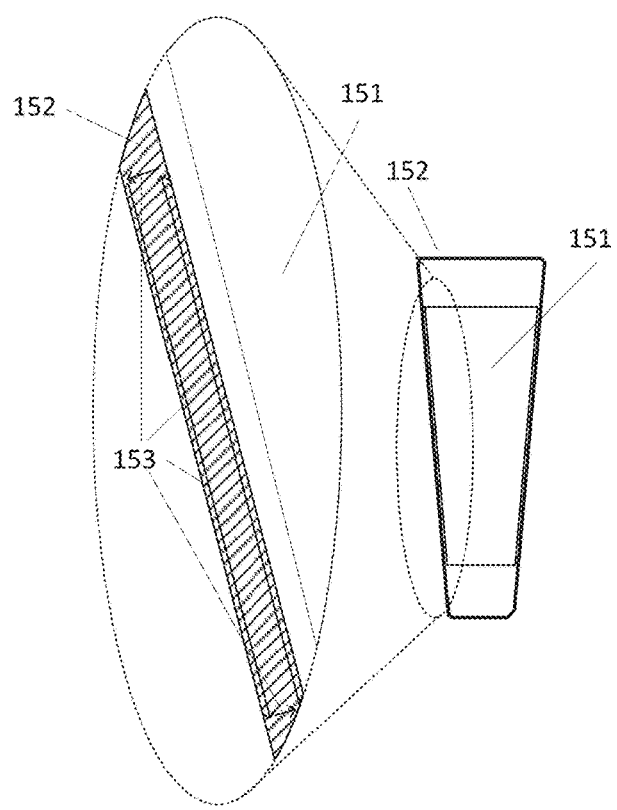
FIGS. 8A and 8B illustrate an example magnet and coil in the electrical machine with the printed circuit board stator.
Figure 8B:
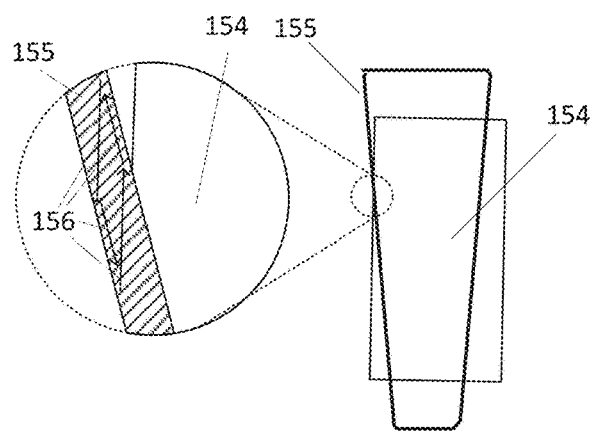

FIGS. 8A and 8B illustrate a simplified view of a single magnet and coil in an example electrical machine with a printed circuit board stator. Two magnet shapes are compared to illustrate differences in the eddy current generated. In FIG. 8A, the shape of the arc segment magnet 151 matches the shape of the arc segment coil 152. The leading edge of the magnetic flux from the magnet passes the entire coil simultaneously as the rotor rotates, potentially causing an eddy current to be generated by the difference in magnetic flux across the width of the trace. The area subjected to the changing magnetic flux is the length of the trace subjected to the changing magnetic field (which in this case is the entire height of the magnet) and the width of the trace. The voltage generated in an internal path 153 is directly proportional to the area subjected to the changing magnetic field, which is the area enclosed by the path, and the current generated in the path is directly proportional to the voltage. Because the power dissipated in the internal path 153 is related to the product of the voltage and the current, machines built according to the topology shown in FIG. 6a may utilize very thin traces to reduce the losses due to eddy currents.

The shape of the arc segment magnet 151 and arc segment coil 152 in FIG. 8A are effectively arc segments and may be well suited to achieving maximum usage of space within the electrical machine, with most of the available space in the air gap containing a high magnetic flux density. This is desirable in machines that require a very small size and where efficiency is not critical.

FIG. 8B illustrates a rectangular magnet 154 moving past an arc segment coil 155. The leading and trailing edge of the magnet may intersect the trace at an angle. Intersecting the trace at an angle may reduce the length of the eddy current path 156 and the area enclosed by the eddy current path 156. Reducing the area enclosed by the eddy current path 156 may result in a reduction of the voltage generated in the loop illustrated by the eddy current path 156 and may thereby reduce the current flowing in the eddy current path 156. The duration of the eddy current in the trace may be extended when compared to the electrical machine of FIG. 8a, but the total current may be related to the square of the path length, while the duration may only be inversely related to the path length. In many cases, the net result is a reduction in eddy current losses. In some cases, eddy currents are not reduced, but the angle between the leading and falling edge of the magnet and the coil permits thicker traces to be used, potentially reducing the resistance of the machine and reducing ohmic losses from output current.

In addition to the rectangular magnet 154 and the arc segment winding 155 illustrated in FIG. 8B, other techniques are contemplated where the magnet in the rotor intersects the stator coil at an angle, including skewing the magnets (so that the leading and falling edge is not directly radial), skewing the windings, and various permutations of magnet and coil shapes which provide an angle between the leading and falling edge of the magnet and the stator coil.

In addition to reducing eddy currents, providing an intersecting angle between the magnets and coils may also help to reduce harmonic content in the output voltage, such as slot order harmonics, and may also help to reduce cogging torque or torque ripple.

If the rotor in FIG. 8B is rotated to a specific position, such as the position shown in FIG. 6, the edges of the rectangular magnet 154 and the arc segment coil 155 may be parallel. If the size is chosen carefully, this position may only occur when the edge is not intersecting a winding, however the angle of intersection of different turns in a complete winding, such as shown in FIG. 5, may be different, potentially reducing or increasing the benefit of an angle between the leading and falling edge of the rectangular magnet 154 and the radial sections arc segment winding 154.

Figure 9:
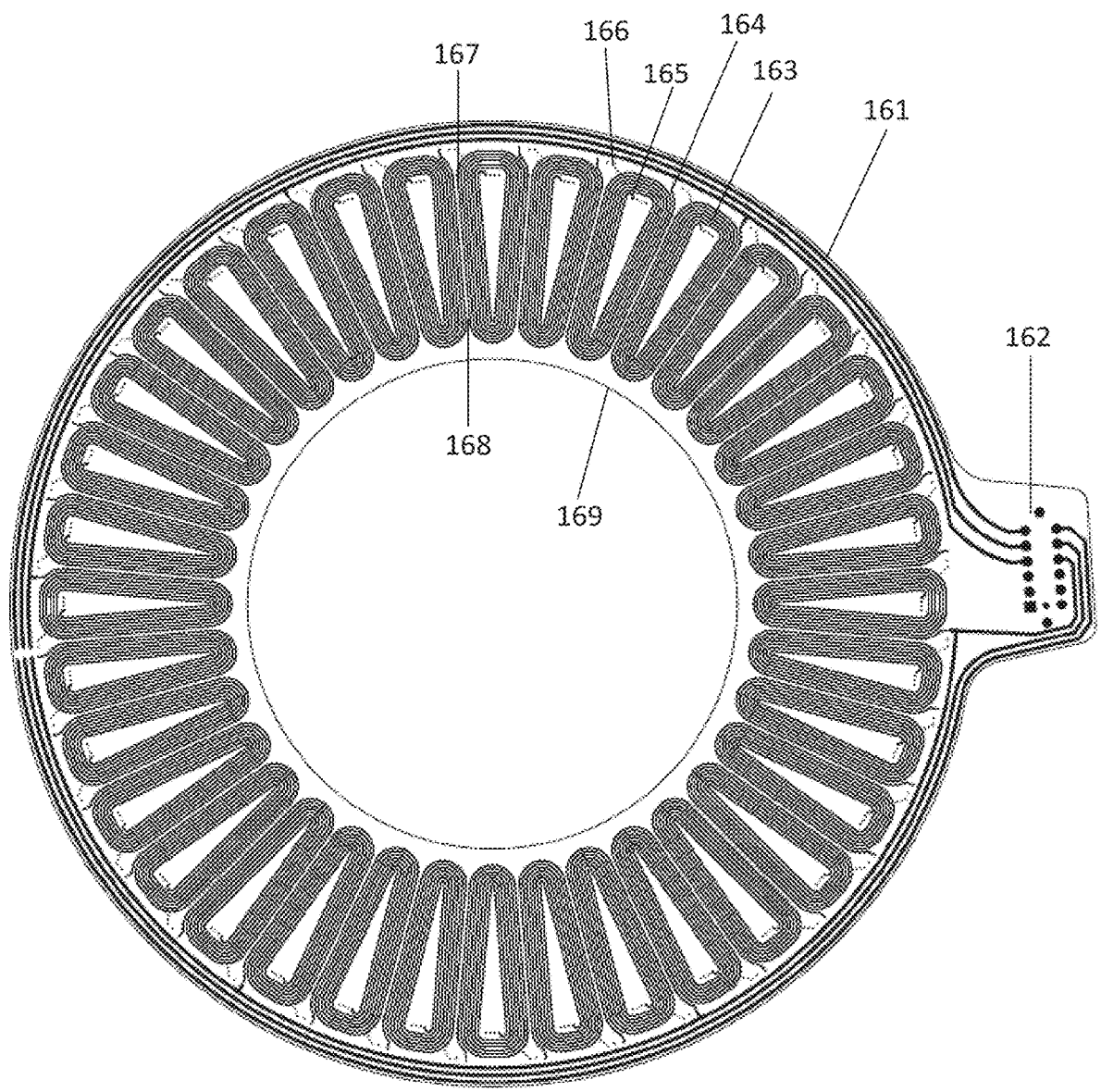
FIG. 9 illustrates an example printed circuit board layout for the stator of the electrical machine.

FIG. 9 illustrates an example 8-layer PCB layout configured to function as a stator for an electrical machine. Current is carried from the windings, such as 4th phase C winding 163 to the connector 162 through circumferential traces such as phase A trace 161. The current flows through each winding to the winding on a subsequent layer through vias. For example, the current on the 4th top layer phase B winding flows from an exterior via 164 connecting to the phase B circumferential trace on the outside of the coil to an interior via 165 connecting it to the windings on the second layer of the board. The second layer winding connects to the third layer winding through exterior via 166 which then connects to the fourth layer winding through another exterior via. The traces continue similarly through the board, using 5 exterior vias and 4 interior vias to connect coils on all eight layers to each other and to the circumferential traces marking the ends of the coils. Some of the circumferential traces exist on internal layers.

The PCB stator for an electrical machine shown in FIG. 9 provides current to an external load or receives current from an external source through the pins of connector 162. Three windings are connected in parallel before connecting to each pin to reduce the current flowing through each winding. Two adjacent windings are connected in series to provide appropriate voltage. The PCB stator for an electrical machine shown in FIG. 9 produces 200 VDC through a rectifier when the machine is spinning at 3300 RPM and with the magnetic field from the rotor produced by 3.2 mm thick N42H magnets. Thermally, it is capable of 8 kW (40 A) when cooled with 50° C. water through the housing.

Figure 10:
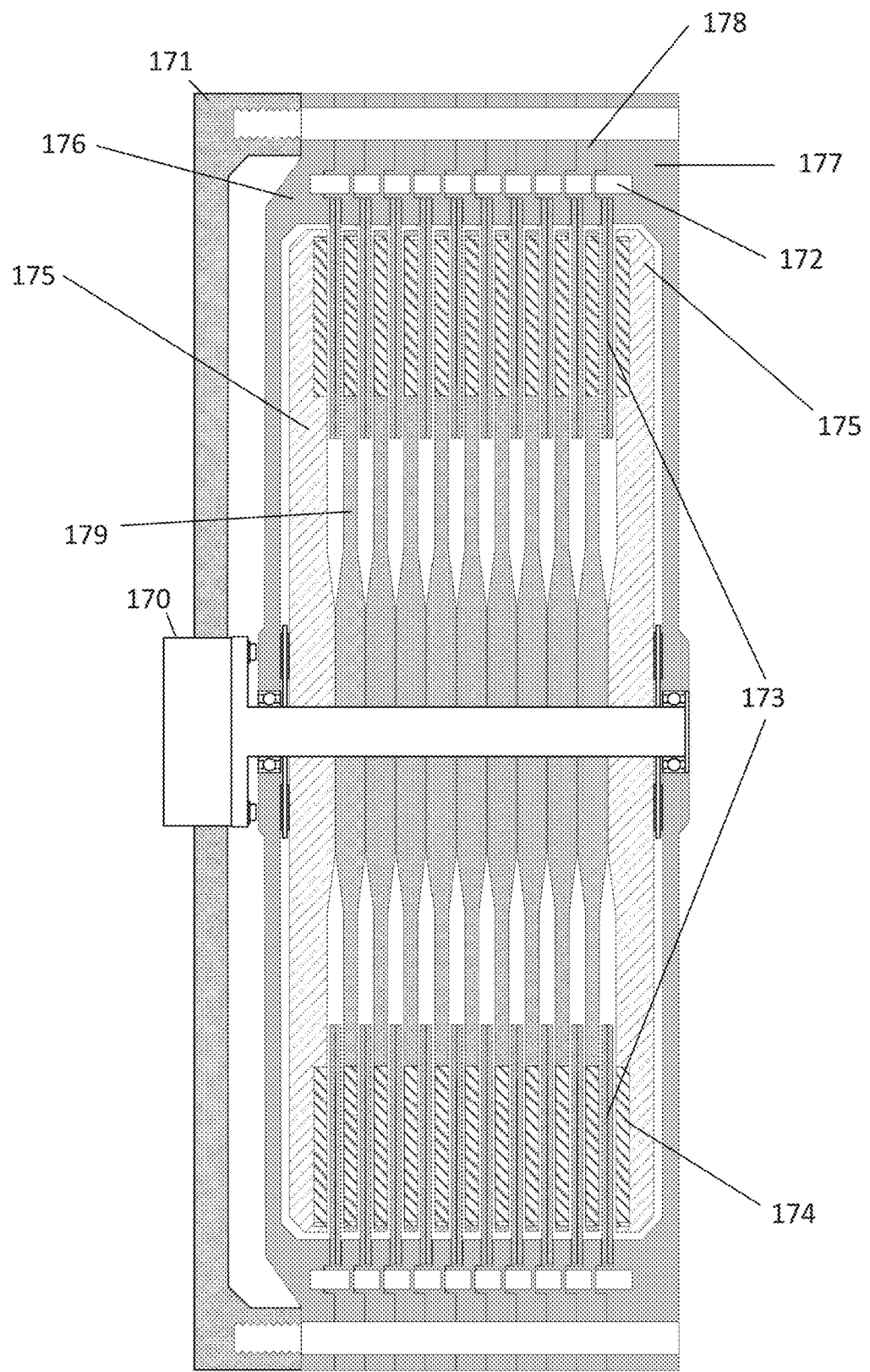
FIG. 10 illustrates an example electrical machine with multiple printed circuit board stators.

FIG. 10 illustrates an example with a plurality of PCB stators 173. Each PCB stator 173 may be placed between two rotor elements, such as rotor end plate 175 or rotor internal plate 179. Each PCB stator 173 may be placed next to other PCB stators 173. Each rotor element, such as rotor end plate 175 or rotor internal plate 179, may have magnetic poles defined by permanent magnets 174, highly permeable ferrous elements, electromagnetic coils, or other pole defining element. The magnetic flux may flow through the entire axial length of the stack and through the endplates. The magnetic flux may only flow between a single PCB stator 173 or stack of PCB stators 173.

Cooling liquid may flow through cooling passages 172. Cooling passage 172 may be one passage or a plurality of passages. Cooling passages 172 may be defined between stator plates, such as interior stator shell 176, exterior stator shell 177 and intermediate stator plate 178. PCB stators 173 may be retained and cooled by contact with stator plates, such as interior stator shell 176, exterior stator shell 177 and intermediate stator plate 178.

The rotor elements, such as rotor end plate 175 or rotor internal plate 179, may be connected to the engine crankshaft 170 by a torsionally-constraining, axially compliant member, such as a drive disk or a splined shaft. Additional components may be connected to the end of the rotating elements or the shaft connecting to the engine crankshaft 170.

The stator plates, such as interior stator shell 176, exterior stator shell 177 and intermediate stator plate 178, may be connected to the engine block 171 directly using a fastener or though a connection that provides compliance, such as a spring plate.

Figure 11:
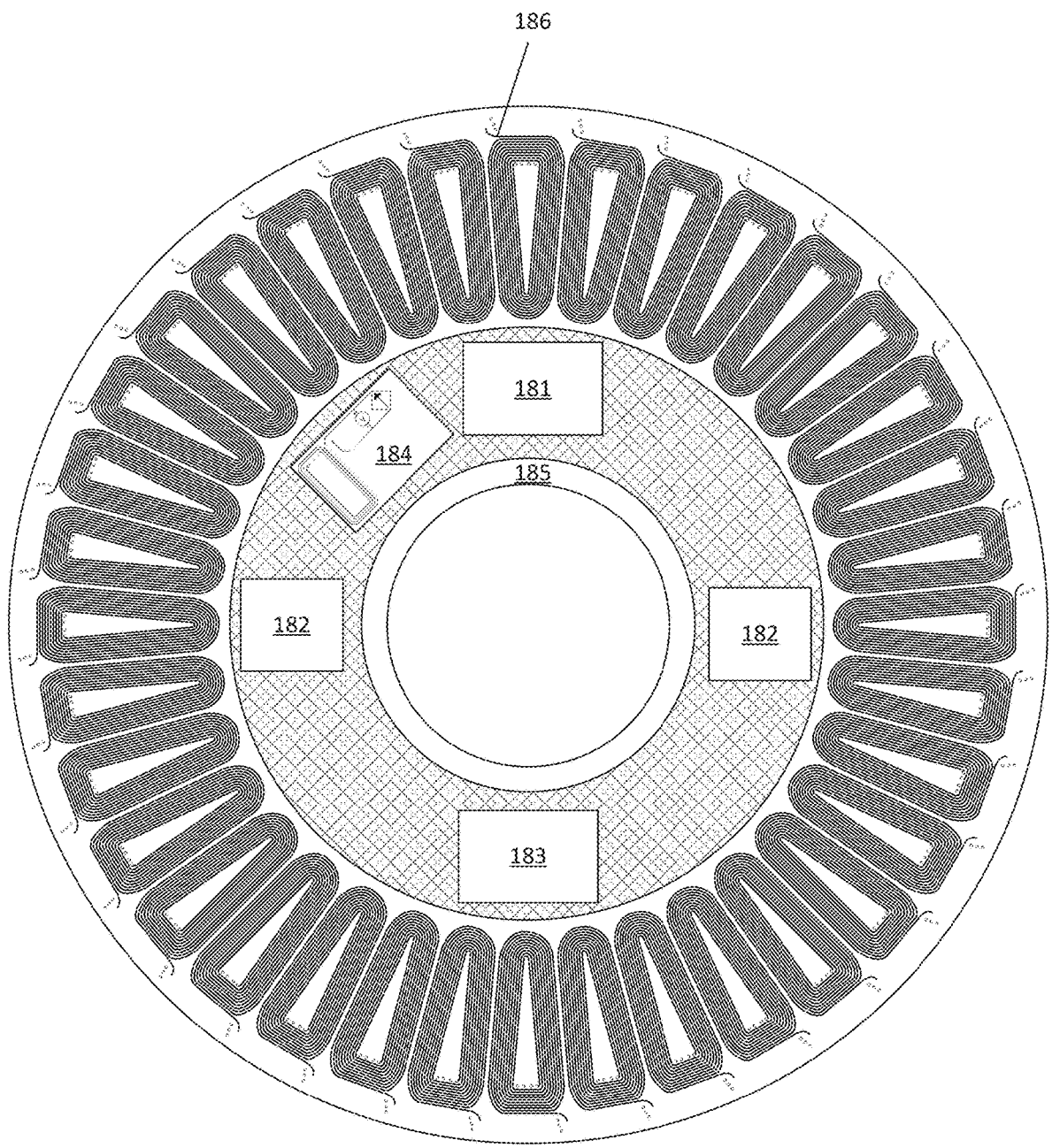
FIG. 11 illustrates an example of a printed circuit board stator also including control circuitry for the electric machine.

FIG. 11 illustrates an example in which the PCB also includes circuitry for control of the electric machine. The PCB may include a controller 181, one or more switches 182, one or more sensors 183, a position sensor 184 that determines the position of the rotor, and one or more communication interfaces 185. The communication interfaces may be uni-directional, bi-directional, digital or analog, such as a voltage or current signal.

The position sensor 184 detects the position of the rotor. For example, the position sensor 184 may include a coil that generates a current in response to the relative position of the stator. The position sensor 184 may include a variable reluctance sensor, a hall effect sensor, an optical sensor, or another sensor.

The controller 181 receives data indicative of the position of the rotor and controls one or more switches 182 in response. The switches turn on the current through the windings to activate current in the appropriate stator coil. As the rotor advances, the controller 181 controls switches 182 to provided current to the next set of coils (e.g., phase A, then phase B, then phase C, etc.). The current in the successive sets of coils pull the rotor in rotation to drive the motor. A similar process may be used for a generator. However, in the generator there may be passive diodes that regulate the current to the coils. In the generator implementation, the position sensor 184 may be omitted, and the phase with the most voltage applies the most torque in order to pull the rotor in rotation to drive the motor. The controller 181 may also send commands to the switch 182 to cause the electric machine to perform synchronous rectifying, a DC voltage adjustment, commutation or another adjustment to the output of the electric machine.

In additional to the components illustrated in FIG. 11, the printed circuit board may contain various semiconductor components, such as diode or transistors, and may perform power conversion, such as AC to DC or DC to AC conversion, or conversion of one voltage level to another.

The printed circuit board shown in FIG. 11 may further include other components in addition to the windings. For example, a generator controller may be mounted on and configured to rotate with the PCB. The generator controller may include a control circuit, for example, including transistors and/or diodes, and/or for conditioning an input signal. The generator controller may include at least one microprocessor configured to analyze data and generate an operating parameter for a field current setting based on the change in the electrical characteristic of the field winding and/or adjust field current setting according to a field current profile. Other traces on the PCB may connect other components such as sensors and communication hardware to the PCB. Other operating parameters may include commands for the generator to modify the output of the exciter or the output of the generator. The generator controller may control the output of the exciter based on a target value. The generator controller may perform load balancing, load shedding, or other paralleling functions for a set of generators.

Figure 12:
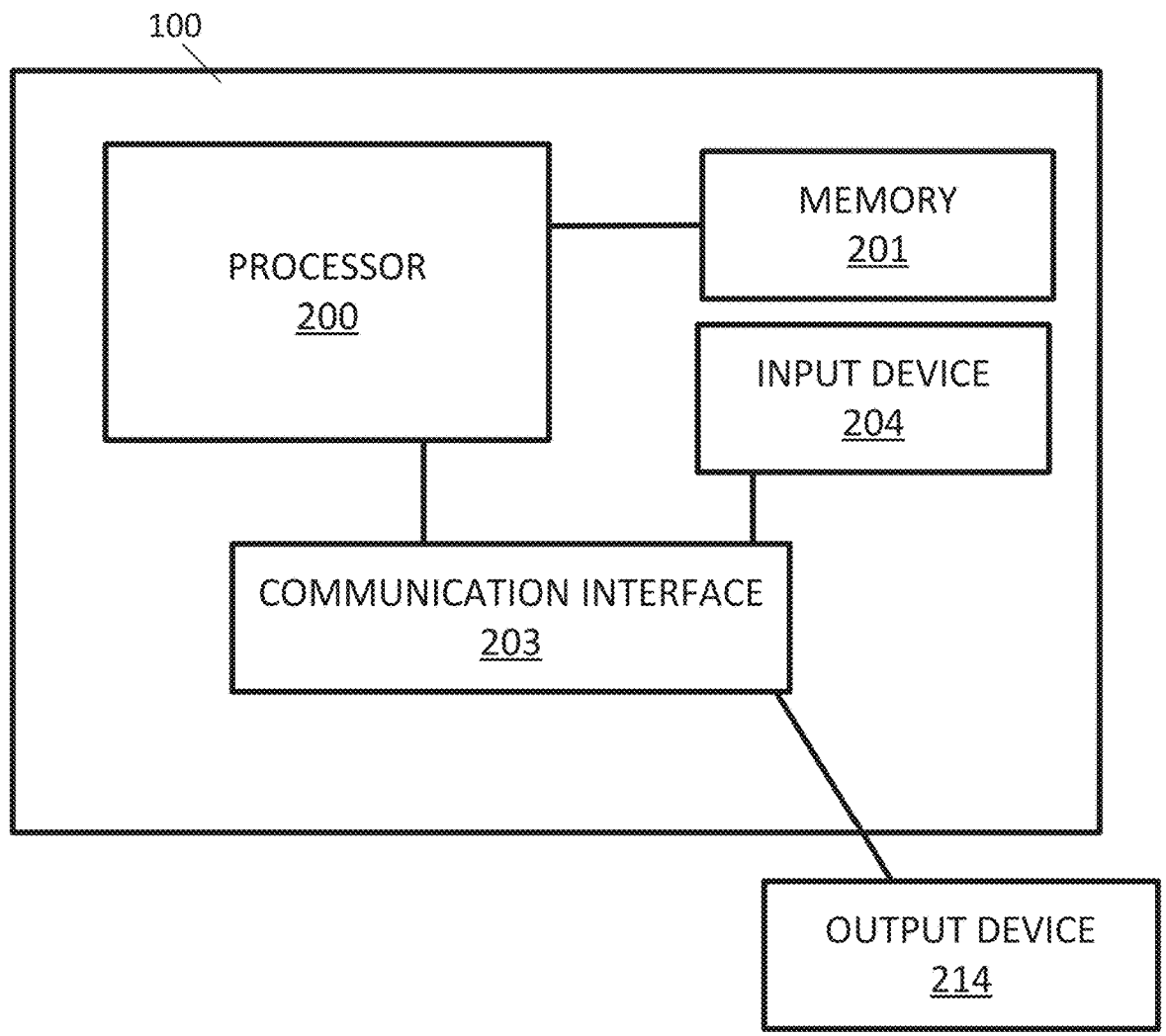
FIG. 12 illustrates an example controller for the printed circuit board stator.

FIG. 12 illustrates an example controller 100. The controller may include a processor 200, a memory 201, and a communication interface 203. The communication interface 203 may communicate with a parallel input signal 210, a sensor input signal 212, a display device 214, and/or an input device 204. Additional, different, or fewer components may be included.

Figure 13:
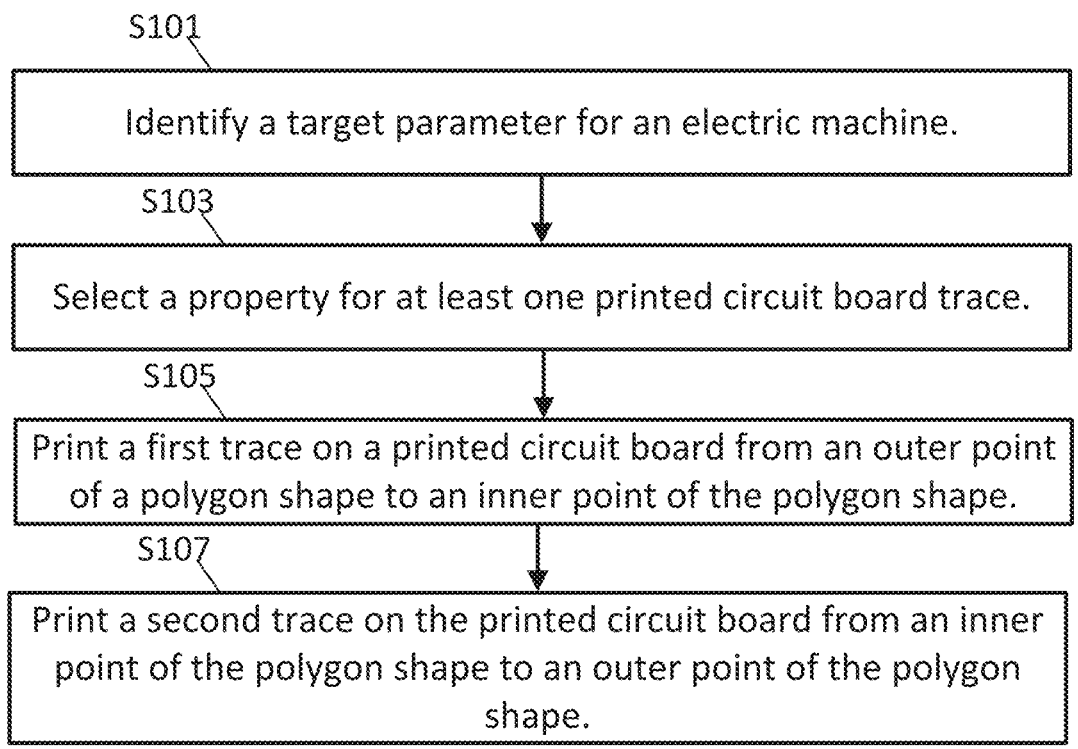
FIG. 13 illustrates an example flowchart for the controller of FIG. 12.

FIG. 13 is an example flow chart for operation of the controller 100 to select the PCB windings for the PCB electric machine. Additional, different, or fewer acts may be included.

At act S101, the processor 200 or the communication interface 203 receives or identifies a target parameter for the electric machine. The target parameter is an output voltage, a speed of the electric machine, a power rating or a current for the output of the electric machine.

At act S103, the processor 200, or through input from the input device 204, selects a property for at least one PCB trace in response to the target parameter. The property for the first trace or the second trace includes a thickness of the first trace or the second trace, the polygon shape for the first trace or the second trace, or a spacing for the first trace or the second trace. The trace arrangement may be selected to minimize eddy current losses. For example, current per winding may be used, such as the total output current per phase divided by the number of coils in parallel. The thickness of trace, shape, or the angle that the trace is positioned may be selected based on current per winding.

At act S105, the processor 200, for example by sending commands to a fabrication machine, causes printing or prints a first trace of the at least one PCB trace on a first layer of the PCB. The first trace is assigned to a first phase of a multi-phase signal of an electric machine. The first trace extends from a first outer point of a polygon shape to a first inner point of the polygon shape.

At act S105, the processor 200, for example by sending commands to the fabrication machine, causes printing or prints a second trace of the at least one PCB trace on a second layer of the PCB. The second trace is assigned to a second phase of the multi-phase signal of the electric machine. The second trace extends from a second inner point of the polygon shape to a second outer point of the polygon shape.

Additional acts may be performed for any number of additional traces (e.g., a third trace, a fourth trace, etc.).

In some examples, the electric machine, including the first trace and the second trace may be tested to for optimization. The optimization may involve comparing the output to an optimization parameter (e.g., speed, efficiency, voltage, power, current) to a threshold and adjusting a variable in attempt to stay within the threshold. The variable that is adjusted may be size, winding shape, spacing, or another factor that adjusts the materials or manufacturing cost of the electric machine.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An electric machine comprising:
a plurality of permanent magnets arranged radially around a rotation axis of the electric machine and spaced apart from the rotation axis of the electric machine, wherein at least one of the plurality of magnets has a shape in a plane of rotation intersected by the rotation axis;
a printed circuit board including a plurality of layers, each layer including a plurality of conductors arranged relative to the plurality of magnets and spaced apart from each other circumferentially around the rotation axis of the electric machine, at least one of the plurality of conductors including a trace having a polygon shape different than the shape of the at least one of the plurality of magnets; and
a top layer circumferential trace electrically connecting a conductor of the plurality of conductors on a top layer of the plurality of layers to a connector configured to provide current to an external load or receive current from an external source, and a bottom layer circumferential trace electrically connecting a conductor of the plurality of conductors on a bottom layer of a plurality of layers to the connector, such that current flowing from the top layer circumferential trace to the bottom layer circumferential trace flows through the conductor of the plurality of conductors on the top layer and the conductor of the plurality of conductors on the bottom layer to the bottom layer circumferential trace.

2. The electric machine of claim 1, wherein the polygon shape comprises a first side at a first radial distance from the rotation axis of the electric machine, a second side at a second radial distance from the rotation axis of the electric machine, and at least one radial side extending between the first side and the second side.

3. The electric machine of claim 2, wherein the first side comprises a first length different than a second length of the second side such that the at least one radial side is at an angle with a radius of the electric machine extending from the rotation axis.

4. The electric machine of claim 1, further comprising:
a rotating assembly including the plurality of permanent magnets; and
a stationary assembly including the plurality of conductors in each layer of the plurality of layers.

5. The electric machine of claim 1, further comprising:
a rotating assembly including the plurality of conductors in each layer of the plurality of layers; and
a stationary assembly including the plurality of permanent magnets.

6. The electric machine of claim 1, wherein a quantity for the plurality of conductors in one layer of the plurality of layers is different than a quantity for the permanent magnets.

7. The electric machine of claim 6, wherein the quantity for the plurality of conductors in one layer of the plurality of layers is greater than the quantity for the permanent magnets.

8. The electric machine of claim 1, wherein the at least one of the plurality of conductors spiral inwardly to a first via in a first layer of a circuit board.

9. The electric machine of claim 8, wherein the at least one of the plurality of conductors spiral outwardly to a second via in a second layer of the circuit board.

10. The electric machine of claim 9, wherein the at least one of the plurality of conductors spiral inwardly to the first via in a clockwise direction and outwardly to the second via in the clockwise direction.

11. The electric machine of claim 9, wherein the at least one of the plurality of conductors spiral inwardly to a third via in a third layer of the circuit board.

12. The electric machine of claim 1, wherein the electric machine is an alternator.

13. The electric machine of claim 1, wherein the electric machine is a motor.

14. A multiple layer printed circuit board for an electric machine, the printed circuit board comprising:
a plurality of layers, each layer including a plurality of conductors arranged relative to a plurality of magnets and spaced apart from each other circumferentially around a rotation axis of the electric machine, at least one of the plurality of conductors including a trace having a polygon shape different than the shape of at least one of the plurality of magnets; and
a top layer circumferential trace electrically connecting a conductor of the plurality of conductors on a top layer of the plurality of layers to a connector configured to provide current to an external load or receive current from an external source, and a bottom layer circumferential trace electrically connecting a conductor of the plurality of conductors on a bottom layer of the plurality of layers to the connector, such that current flowing from the top layer circumferential trace to the bottom layer circumferential trace flows through the conductor of the plurality of conductors on the top layer and the conductor of the plurality of conductors on the bottom layer to the bottom layer circumferential trace.

15. The electric machine of claim 14, wherein the polygon shape comprises a first side at a first radial distance from the rotation axis of the electric machine, a second side at a second radial distance from the rotation axis of the electric machine, and at least one radial side extending between the first side and the second side.

* * * * *